United States Patent
Sun et al.

(10) Patent No.: US 12,245,158 B2
(45) Date of Patent: Mar. 4, 2025

(54) POWER CONTROL METHOD AND DEVICE

(71) Applicant: VIVO MOBILE COMMUNICATION CO., LTD., Guangdong (CN)

(72) Inventors: Xiaodong Sun, Chang'an Dongguan (CN); Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 359 days.

(21) Appl. No.: 17/569,907

(22) Filed: Jan. 6, 2022

(65) Prior Publication Data

US 2022/0132433 A1    Apr. 28, 2022

Related U.S. Application Data

(63) Continuation of application No. PCT/CN2020/099041, filed on Jun. 29, 2020.

(30) Foreign Application Priority Data

Jul. 12, 2019   (CN) .......................... 201910631595.3

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0051* (2013.01); *H04W 16/28* (2013.01); *H04W 52/242* (2013.01); *H04W 52/325* (2013.01)

(58) Field of Classification Search
CPC . H04W 52/146; H04W 16/28; H04W 52/242; H04W 52/325; H04L 5/0051
(Continued)

(56) References Cited

U.S. PATENT DOCUMENTS

2011/0195735 A1*   8/2011   Irmer .................. H04W 52/346
                                                         455/509
2014/0171143 A1*   6/2014   Liu ..................... H04W 52/146
                                                         455/522
(Continued)

FOREIGN PATENT DOCUMENTS

CN       104349443 A       2/2015
CN       109600154 A       4/2019
(Continued)

OTHER PUBLICATIONS

International Search Report and Written Opinion dated Oct. 9, 2020 as received in application No. PCT/CN2020/099041.
(Continued)

*Primary Examiner* — Mark G. Pannell
(74) *Attorney, Agent, or Firm* — BROOKS KUSHMAN P.C.

(57) ABSTRACT

A power control method and a device are provided. The method is applied to a terminal device. The method includes: receiving configuration information from a network device, where the configuration information is used to indicate target spatial relation information of target uplink data; and determining transmit power of the target uplink data based on the target spatial relation information, where the target spatial relation information includes at least one of the following: M power control parameters, a target power control parameter corresponding to the target spatial relation information, and information used to indicate the target power control parameter, where M is a positive integer; and the target uplink data includes a sounding reference signal SRS or a physical uplink shared channel PUSCH.

18 Claims, 6 Drawing Sheets

(51) Int. Cl.
*H04W 16/28* (2009.01)
*H04W 52/24* (2009.01)
*H04W 52/32* (2009.01)

(58) Field of Classification Search
USPC .......................................................... 370/318
See application file for complete search history.

(56) References Cited

U.S. PATENT DOCUMENTS

| | | | | |
|---|---|---|---|---|
| 2014/0376482 | A1* | 12/2014 | Kim | H04L 5/0048 370/329 |
| 2016/0128027 | A1* | 5/2016 | Gulati | H04W 52/383 370/329 |
| 2016/0183195 | A1 | 6/2016 | Gao | |
| 2018/0069685 | A1* | 3/2018 | Yang | H04W 52/34 |
| 2019/0081753 | A1* | 3/2019 | Jung | H04W 24/10 |
| 2019/0191382 | A1 | 6/2019 | Zhang | |
| 2019/0191391 | A1 | 6/2019 | Ekpenyong | |
| 2019/0261320 | A1* | 8/2019 | Yu | H04W 56/001 |
| 2019/0281588 | A1* | 9/2019 | Zhang | H04B 7/0617 |
| 2020/0059867 | A1* | 2/2020 | Haghighat | H04W 52/367 |
| 2020/0178280 | A1* | 6/2020 | Guan | H04B 7/0626 |
| 2020/0280929 | A1 | 9/2020 | Chen | |
| 2021/0058873 | A1* | 2/2021 | Gao | H04W 72/04 |
| 2021/0168725 | A1* | 6/2021 | Muruganathan | H04W 52/146 |
| 2022/0216929 | A1 | 7/2022 | Matsumura et al. | |

FOREIGN PATENT DOCUMENTS

| | | |
|---|---|---|
| CN | 109640385 A | 4/2019 |
| WO | 2019046193 A1 | 3/2019 |
| WO | 2019062387 A1 | 4/2019 |
| WO | 2019100296 A1 | 5/2019 |
| WO | 2020230839 A1 | 11/2020 |

OTHER PUBLICATIONS

Extended European Search Report dated Jul. 25, 2022 as received in application No. 20839767.9.
Ericsson., "Signalling reduction for beam-based UL power control," 3GPP TSG-RAN WG1 Meeting #97, Tdoc R1-1907475, pp. 1-3, (May 13-17, 2019).
JP Office Action dated Feb. 7, 2023 as received in Application No. 2022-501350 .
KR Office Action dated Jun. 20, 2023 as received in Application No. 10-2022-7001522.
First Office Action for Japanese Application No. 2023-106214, dated Aug. 21, 2024, 2 Pages.

* cited by examiner

POWER CONTROL METHOD AND DEVICE

CROSS-REFERENCE TO RELATED APPLICATIONS

This application is a continuation application of International Application No. PCT/CN2020/099041 filed on Jun. 29, 2020, which claims priority to Chinese Patent Application No. 201910631595.3, filed in China on Jul. 12, 2019, which is incorporated herein by reference in its entirety.

TECHNICAL FIELD

This disclosure relates to the field of communications technologies, and in particular, to a power control method and a device.

BACKGROUND

In Rel-15, a network device indicates, by using a sounding reference signal (SRS) resource indicator (SRI) field in downlink control information (DCI), a power control parameter to be used by a terminal device to transmit a physical uplink shared channel (PUSCH). The SRI field in the DCI corresponds to one SRS resource. The SRS resource includes spatial relation information, and the spatial relation information indicates a transmit beam of the PUSCH. The SRI further indicates a PUSCH power control parameter. The terminal device may determine transmit power of the PUSCH by using the power control parameter.

Generally, different beams correspond to different path losses, and corresponding transmit power also varies. If the spatial relation information changes, the network device may need to reconfigure a power control parameter for the terminal device.

However, when the network device does not reconfigure the power control parameter for the terminal device in time, the terminal device continues to use the previously configured power control parameter to transmit the PUSCH. Consequently, the terminal device transmits the PUSCH by using inaccurate power, and the PUSCH causes interference to another terminal device, or coverage of the PUSCH is limited.

SUMMARY

According to a first aspect, an embodiment of this disclosure provides a power control method, applied to a terminal device, where the method includes: receiving configuration information from a network device, where the configuration information is used to indicate target spatial relation information of target uplink data; and determining transmit power of the target uplink data based on the target spatial relation information, where the target spatial relation information includes at least one of the following: M power control parameters, a target power control parameter corresponding to the target spatial relation information, and information used to indicate the target power control parameter, where M is a positive integer; and the target uplink data includes an SRS or a PUSCH.

According to a second aspect, an embodiment of this disclosure provides a power control method, applied to a network device, where the method includes: transmitting configuration information to a terminal device, where the configuration information is used to indicate target spatial relation information of target uplink data, where the target spatial relation information includes at least one of the following: M power control parameters, a target power control parameter, and information used to indicate the target power control parameter, where M is a positive integer; and the target uplink data includes an SRS or a PUSCH.

According to a third aspect, an embodiment of this disclosure provides a terminal device, where the terminal device includes a receiving module, configured to receive configuration information from a network device, where the configuration information is used to indicate target spatial relation information of target uplink data; and a determining module, configured to determine transmit power of the target uplink data based on the target spatial relation information, where the target spatial relation information includes at least one of the following: M power control parameters, a target power control parameter corresponding to the target spatial relation information, and information used to indicate the target power control parameter, where M is a positive integer; and the target uplink data includes an SRS or a PUSCH.

According to a fourth aspect, an embodiment of this disclosure provides a network device, where the network device includes a transmission module, configured to transmit configuration information to a terminal device, where the configuration information is used to indicate target spatial relation information of target uplink data, where the target spatial relation information includes at least one of the following: M power control parameters, a target power control parameter, and information used to indicate the target power control parameter, where M is a positive integer; and the target uplink data includes an SRS or a PUSCH.

According to a fifth aspect, an embodiment of this disclosure provides a terminal device, including a processor, a memory, and a computer program stored in the memory and capable of running on the processor, where when the computer program is executed by the processor, the steps of the power control method according to the first aspect are implemented.

According to a sixth aspect, an embodiment of this disclosure provides a network device, including a processor, a memory, and a computer program stored in the memory and capable of running on the processor, where when the computer program is executed by the processor, the steps of the power control method according to the second aspect are implemented.

According to a seventh aspect, an embodiment of this disclosure provides a computer-readable storage medium, where the computer-readable storage medium stores a computer program, and when the computer program is executed by a processor, the steps of the foregoing power control method are implemented.

DESCRIPTION OF EMBODIMENTS

For ease of understanding, the following describes some of the terms included in the embodiments of this disclosure.

The term "and/or" in this specification describes only an association relationship for describing associated objects and represents that three relationships may exist. For example, A and/or B may represent the following three cases: only A, both A and B, and only B. In addition, the symbol "/" in this specification generally represents an "or" relationship between associated objects. In a formula, the symbol "/" indicates a "division" relationship between the associated objects. Unless otherwise specified, "a plurality of" in this specification refers to two or more than two.

For ease of clear description of the technical solutions of the embodiments of this disclosure, in the embodiments of this disclosure, the words "first" "second", and the like are used to distinguish the same items or similar items having substantially the same functions or roles, and a person skilled in the art can understand that the words "first" "second", and the like do not constitute any limitation on a quantity and an execution order.

It should be noted that, in the embodiments of this disclosure, words such as "an example" or "for example" are used to represent an example, an instance, or an illustration. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

The following describes the technical solutions provided in this application with reference to the accompanying drawings.

The technical solutions provided in this disclosure can be applied to various communications systems, such as a 5G communications system, a future evolved system, or a plurality of communication fusion systems. A plurality of application scenarios may be included, for example, machine-to-machine (M2M), D2D, macro-micro communication, enhanced mobile Internet (eMBB), ultra reliable and low latency communications (uRLLC), and massive machine-type communications (mMTC) scenarios. These scenarios include, but are not limited to, scenarios such as communication between terminal devices, communication between network devices, or communication between a network device and a terminal device. The embodiments of this disclosure can be applied to communication between a network device and a terminal device, or communication between terminal devices, or communication between network devices in a 5G communications system.

Figure 1:
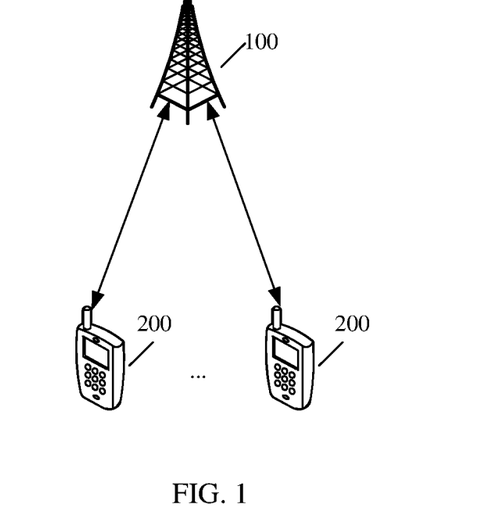
FIG. 1 is a possible schematic structural diagram of a communications system according to an embodiment of this disclosure.

FIG. 1 is a possible schematic structural diagram of a communications system included in the embodiments of this disclosure. As shown in FIG. 1, the communications system includes at least one network device 100 (only one is shown in FIG. 1) and one or more terminal devices 200 to which each network device 100 is connected.

The network device 100 may be a base station, a core network device, a transmission and reception point (TRP), a relay station, an access point, or the like. The network device 100 may be a base transceiver station (BTS) in a global system for mobile communications (GSM) or code division multiple access (CDMA) network, may be an NB (NodeB) in wideband code division multiple access (WCDMA), or may be an eNB or eNodeB in LTE. The network device 100 may alternatively be a radio controller in a cloud radio access network (CRAN) scenario. The network device 100 may alternatively be a network device in a 5G communications system or a network device in a future evolved network. However, the use of words does not constitute any limitation on this disclosure.

The terminal device 200 may be a wireless terminal device or may be a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, or a terminal device in a future evolved PLMN network, or the like. The wireless terminal device may communicate with one or more core networks by using a radio access network (RAN). The wireless terminal device may be a mobile terminal device, such as a mobile phone (also referred to as a "cellular" phone) and a computer that is provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, user equipment (UE), a UE terminal device, an access terminal device, a wireless communications device, a terminal unit, a terminal device station, a mobile station, a mobile, a remote station, a remote terminal, a subscriber unit, a subscriber station, a user agent, a terminal apparatus, or the like. As an example, in this embodiment of this disclosure, it is assumed that the terminal device is a mobile phone in FIG. 1.

In current uplink transmission, when the network device does not reconfigure a power control parameter for the terminal device in time, the terminal device continues to use a previously configured power control parameter to transmit an SRS or a PUSCH. Consequently, the terminal device transmits the SRS or PUSCH by using inaccurate power, and the SRS or PUSCH causes interference or transmission failure to another terminal device. The network device can configure a power control parameter of the SRS by using radio resource control (RRC) signaling, or by configuring an SRS resource set. Each resource set may include at leastone SRS resource, and each SRS resource includes spatial relation information indicating a transmit beam of the SRS.

To resolve the foregoing problem, the network device may transmit configuration information to the terminal device, where the configuration information is used to indicate target spatial relation information of target uplink data; and the terminal device may determine transmit power of the target uplink data based on the target spatial relation information. In comparison with conventional uplink transmission, in a case that the spatial relation information changes, if the target spatial relation information includes at least one of the following: M power control parameters, a target power control parameter corresponding to the target spatial relation information, and information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, an SRS or a PUSCH), but also avoids signaling configuration overheads and a delay caused by reconfiguring the power control parameter.

Figure 2:
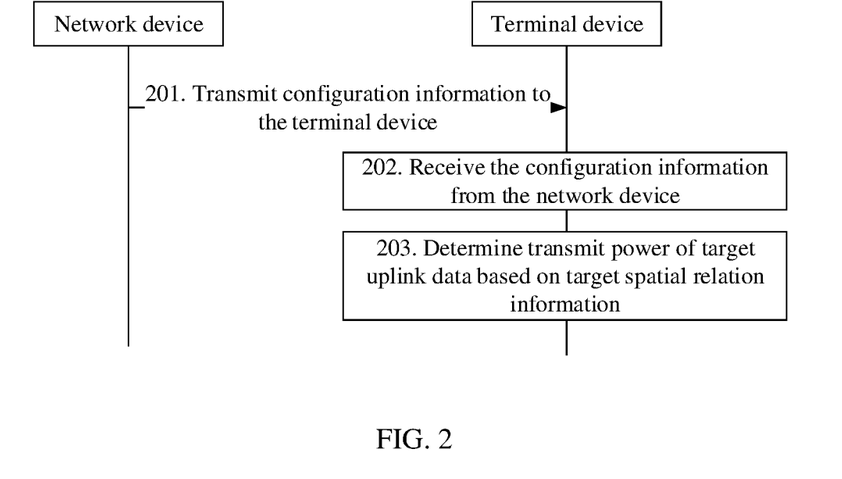
FIG. 2 is a schematic interaction flowchart of a power control method according to an embodiment of this disclosure.

FIG. 2 is a schematic interaction flowchart of a power control method according to an embodiment of this disclosure. As shown in FIG. 2, the power control method provided in this embodiment of this disclosure may include the following step 201 to step 203:

Step 201: A network device transmits configuration information to a terminal device.

Step 202: The terminal device receives the configuration information from the network device.

The configuration information is used to indicate target spatial relation information of target uplink data; and the target spatial relation information corresponds to a target power control parameter. The target uplink data includes an SRS or a PUSCH.

Optionally, the target spatial relation information includes at least one of the following: M power control parameters, a target power control parameter corresponding to the target spatial relation information, and information used to indicate the target power control parameter.

For example, the target spatial relation information carries a first identifier, that is, the information used to indicate the target power control parameter is the first identifier. The first identifier is used to indicate the target power control parameter. The terminal device may determine, from the M power control parameters based on the first identifier, the target power control parameter indicated by the first identifier.

For example, in a case that the target spatial relation information includes the M power control parameters, the information used to indicate the target power control parameter may be configured by the network device for the terminal device by using other configuration information or signaling.

For example, in a case that the target related information includes the M power control parameters, the terminal device may determine the target power control parameter from the M power control parameters based on a predefined rule. The target rule may be configured by the network device, or may be predefined.

For example, the target power control parameter may be at least one of the M power control parameters, where M is a positive integer. Any power control parameter corresponds to a beam.

In an example, in a case that the target spatial relation information includes the M power control parameters and the information used to indicate the target power control parameter, the target power control parameter is at least one of the M power control parameters.

For example, the configuration information is used to indicate the M power control parameters. In an example a, the configuration information includes the target spatial relation information and the M power control parameters. In an example b, the configuration information includes the target spatial relation information, and the target spatial relation information includes the M power control parameters.

For example, the configuration information is used to indicate the target power control parameter. In an example c, the configuration information includes the target spatial relation information and the target power control parameter. In an example d, the configuration information includes the target spatial relation information, and the target spatial relation information includes the target power control parameter.

For example, the M power control parameters are preconfigured by the network device for the terminal device, or predefined, or specified by a protocol. For example, the M power control parameters may be preconfigured before the network device transmits the configuration information.

In an example, after obtaining the information used to indicate the target power control parameter, the terminal device determines, from the M power control parameters based on the information used to indicate the target power control parameter, the target power control parameter indicated by the information used to indicate the target power control parameter.

It can be understood that after obtaining the target spatial relation information, the terminal device can determine, from the M preconfigured power control parameters based on the target spatial relation information when the spatial relation information changes, the target power control parameter indicated by the target spatial relation information, thereby avoiding a delay caused by re-receiving the power control parameter configured by the network device, so that the network device no longer needs to transmit the reconfigured power control parameter to the terminal device, and that the network device does not need to configure additional signaling.

For example, the target spatial relation information may be further used to indicate a transmit beam of the target uplink data. For example, using transmission of an SRS as an example, spatial relation information 1 indicates that a transmit beam for transmitting the SRS is a beam 1, and spatial relation information 2 indicates that a transmit beam for transmitting the SRS is a beam 2.

Optionally, that the configuration information is used to indicate target spatial relation information of target uplink data may be that the configuration information includes the target spatial relation information, or may be that the configuration information carries an identifier indicating the target spatial relation information.

In an example, at least one piece of spatial relation information may be prestored in the terminal device, and the configuration information carrying the identifier indicating the target spatial relation information may indicate the target spatial relation information in the at least one piece of spatial relation information.

Step 203: The terminal device determines transmit power of the target uplink data based on the target spatial relation information.

It should be noted that the configuration information may be configuration information that is configured by the network device and used for the terminal device to transmit the target uplink data, or may be configuration information that is configured by the network device and used for the terminal device to switch between transmit beams. The switching between transmit beams may be: switching from a first beam for transmitting the SRS to a second beam for transmitting the SRS; or the switching between transmit beams may be: switching from a first beam for transmitting the PUSCH to a second beam for transmitting the PUSCH.

In an example, the terminal device may first determine the target spatial relation information from the configuration information after receiving the configuration information, and then determine, based on the target spatial relation information, the transmit beam indicated by the target spatial relation information, and the target power control parameter corresponding to the target uplink data.

In the power control method provided in this embodiment of this disclosure, the network device may transmit the configuration information to the terminal device, where the configuration information is used to indicate the target spatial relation information of the target uplink data; and the terminal device may determine the transmit power of the target uplink data based on the target spatial relation information. In comparison with conventional uplink transmission, in a case that the spatial relation information changes, if the target spatial relation information includes at least one of the following: the M power control parameters, the target power control parameter corresponding to the target spatial relation information, and the information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, the SRS or the PUSCH), but also avoids signaling configuration overheads and a delay caused by reconfiguring the power control parameter.

Optionally, the target spatial relation information includes at least one of the following: an SRS power control parameter set, an identifier of the SRS power control parameter set, a PUSCH power control parameter set, a PUSCH power control parameter identifier set, and a target SRS resource identifier SRI. The SRS power control parameter includes a target power control parameter, and the target power control parameter is a power control parameter for transmitting the SRS. The PUSCH power control parameter set includes a target power control parameter, and the target power control parameter is a power control parameter for transmitting the PUSCH. The PUSCH power control parameter identifier set includes an identifier of a target power control parameter, and the target power control parameter is a power control parameter for transmitting the PUSCH. The target SRI is used to indicate a PUSCH power control parameter identifier set.

Generally, any power control parameter includes at least one of the following: preset received power (P0) of the network device, a path loss compensation factor (alpha), a path loss calculation reference reference signal (PathlossReferenceRS), and a closed loop power control process (CloseloopProcess).

For example, when the SRS is transmitted, the preset received power is preset received power for receiving the SRS by the network device; or when the PUSCH is transmitted, the preset received power is preset received power for receiving the PUSCH by the network device.

It may be understood that the terminal device may calculate a path loss based on the path loss calculation reference reference signal, and then calculate the transmit power based on other power control parameters.

Figure 3:
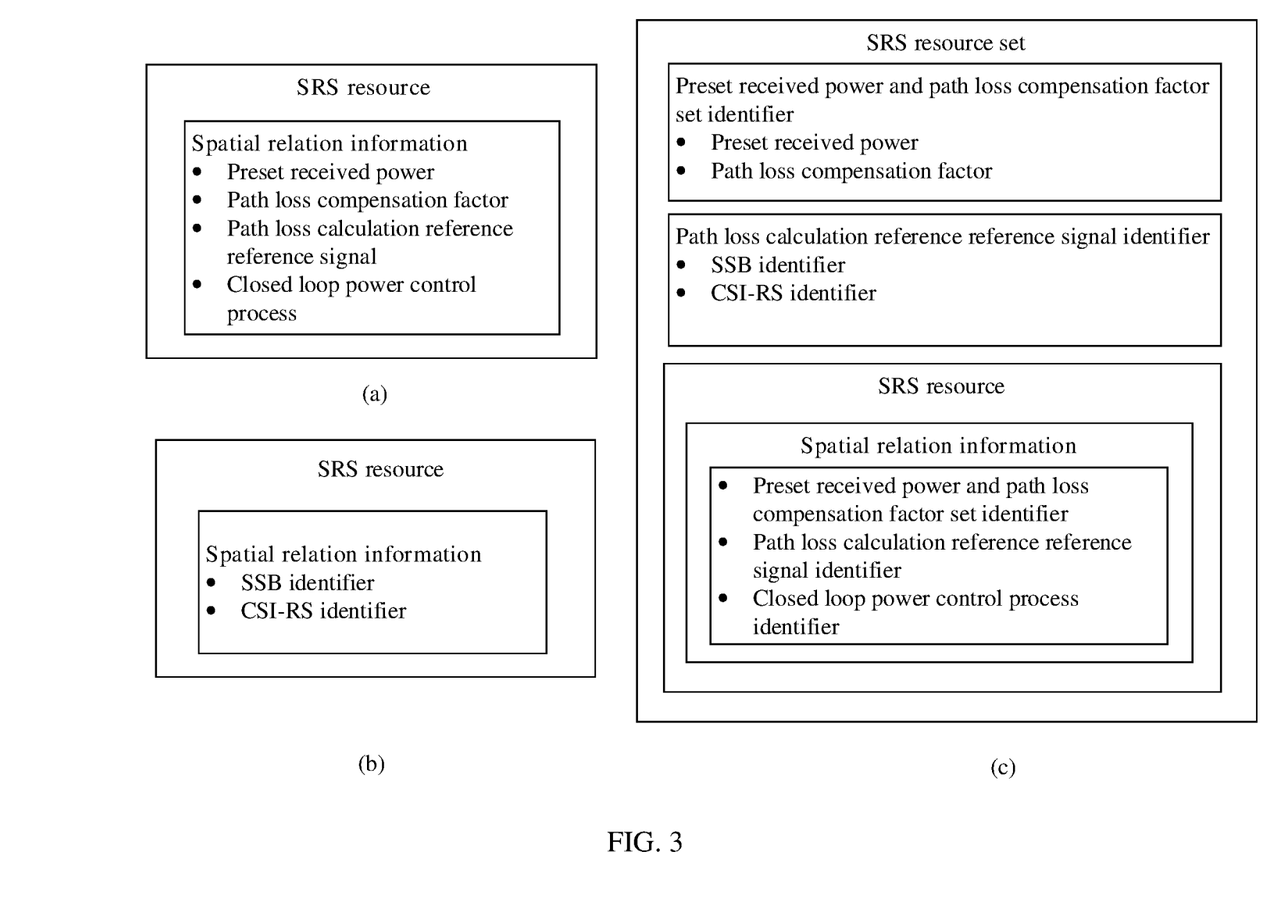
FIG. 3 is a schematic structural diagram 1 of a resource according to an embodiment of this disclosure.

For example, FIG. 3 is a schematic diagram of an SRS resource according to an embodiment of this disclosure. As shown in FIG. 3 (a), spatial relation information in the SRS resource includes a power control parameter set, where the power control parameter set is {P0, alpha, PathlossReferenceRS, CloseloopProcess}. When the spatial relation information corresponding to the SRS resource is spatial relation information of the PUSCH, the power control parameter set is a PUSCH power control parameter set; or when the spatial relation information corresponding to the SRS resource is spatial relation information of the SRS, the power control parameter set is an SRS power control parameter set.

For ease of description, in the embodiments of this disclosure, an example in which the power control parameter includes the preset received power (P0) of the network device, the path loss compensation factor (alpha), the path loss calculation reference reference signal (PathlossReferenceRS), and the closed loop power control process (CloseloopProcess) is used for description. This is not repeated herein.

Optionally, in this embodiment of this disclosure, in a case that the target uplink data is the SRS, the target spatial relation information includes at least one of the following: an SRS power control parameter set and an identifier of the SRS power control parameter set.

For example, the target spatial relation information may be SRS resource set information configured by the network device, and the SRS resource set information includes at least one of an SRS power control parameter set, and an identifier of the SRS power control parameter set.

Each SRS resource in the SRS resource set may include spatial relation information, and a power control parameter set is configured in the spatial relation information.

Optionally, in this embodiment of this disclosure, in a case that the target uplink data is the PUSCH, the target spatial relation information includes at least one of the following: a PUSCH power control parameter set, a PUSCH power control parameter identifier set, and a target SRS resource indicator SRI.

For example, the target spatial relation information may be SRS spatial relation information configured by the network device, and the SRS spatial relation information includes at least one of a PUSCH power control parameter set, a PUSCH power control parameter identifier set, and a target SRS resource identifier SRI.

Figure 4:
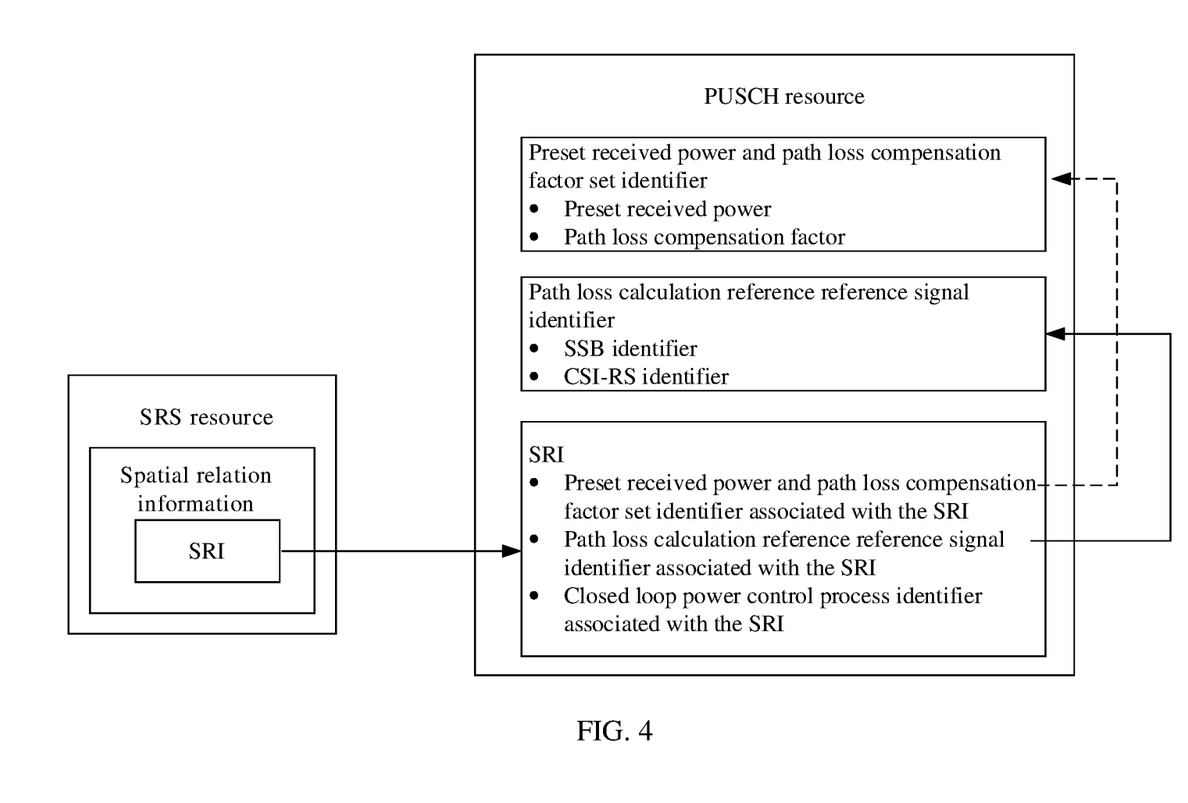
FIG. 4 is a schematic structural diagram 2 of a resource according to an embodiment of this disclosure.

For example, with reference to FIG. 4, the PUSCH power parameter identifier set may include {P0 identifier, alpha identifier, PathlossReferenceRS identifier, CloseloopProcess}. The spatial relation information in the SRS resource may include an SRI (for example, a target SRI), where the SRI corresponds to a power control parameter identifier set that is in a PUSCH resource and associated with the SRI. For example, the PUSCH resource includes a set 1 and a set 2, an SRI 1 corresponds to the set 1, and an SRI 2 corresponds to the set 2, where the set 1 includes {P0 set 1, alpha set 1, PathlossReferenceRS1, CloseloopProcess1}, and the set 2 includes {P0 set 2, alpha set 2, PathlossReferenceRS2, CloseloopProcess2}.

Optionally, when the target power control parameter is at least one of the M power control parameters preconfigured by the network device for the terminal device, before step 201, the power control method provided in this embodiment of this disclosure further includes step 204a and step 204b.

Step 204a: The network device transmits the M power control parameters to the terminal device.

Step 204b: The terminal device receives the M power control parameters from the network device.

Optionally, in this embodiment of this disclosure, before step 201, the power control method provided in this embodiment of this disclosure further includes steps 205a and 205b.

Step 205a: The network device transmits N pieces of spatial relation information to the terminal device.

The N pieces of spatial relation information may be used to indicate the M power control parameters, where N is a positive integer.

Step 205b: The terminal device receives the N pieces of spatial relation information from the network device.

Optionally, the network device may transmit the N pieces of spatial relation information to the terminal device by using RRC signaling.

Based on this solution, before the network device transmits the configuration information to the terminal device, the network device may transmit the M power control parameters to the terminal device by transmitting the N pieces of spatial relation information to the terminal device, so that the terminal device can quickly determine, after receiving the configuration information, the target power control parameter from the M power control parameters indicated by the N pieces of spatial relation information transmitted by the network device in advance.

Optionally, in this embodiment of this disclosure, the configuration information is used to indicate at least one SRS resource, and the at least one SRS resource includes the target spatial relation information, where the configuration information is carried in a target MAC CE (the MAC CE is a control element at a media access layer), and the at least one SRS resource is an SRS resource corresponding to the target MAC CE; and/or the configuration information includes a SRS resource indicator (SRI) of the at least one SRS resource.

It may be understood that, in a case that the configuration information is used to indicate a resource set (including at least one SRS resource), each SRS resource in the SRS resource set includes spatial relation information, and the SRS resource set includes target spatial relation information. A target SRS resource in the SRS resource set may carry an SRS power control parameter set and/or an identifier of the SRS power control parameter set, that is, the target SRS resource includes target spatial relation information.

With reference to FIG. 3(c), the SRS resource set includes at least one SRS resource (one SRS resource is used as an example in the figure), and the SRS spatial relation information in the SRS resource includes a P0 set identifier, an alpha set identifier, a PathlossReferenceRS identifier, and a CloseloopProcess identifier.

Assuming that before step 201, the terminal device performs uplink transmission on the first beam, the uplink transmission performed on the first beam may be transmitting the PUSCH or transmitting the SRS.

Optionally, if the transmit beam indicated by the target spatial relation information changes to the second beam, and the second beam is different from the first beam, the terminal device may determine transmit power of the target uplink data on the second beam based on the target power control parameter indicated in the target spatial relation information.

Example 1: A first MAC CE is a MAC CE carrying first configuration information before the configuration information is received, the first MAC CE corresponds to a first SRS resource, a second MAC CE is a MAC CE carrying the configuration information, and the second MAC CE corresponds to a second SRS resource. The first SRS resource includes first spatial relation information, and the first spatial relation information includes {P01, alpha1, PathlossReferenceRS1, CloseloopProcess1}; the second SRS resource includes second spatial relation information, and the second spatial relation information includes {P02, alpha2, PathlossReferenceRS2, CloseloopProcess2}; the first configuration information is used to configure the terminal device to determine power by using the power control parameter indicated by the first spatial relation information.

In a case that the SRS is transmitted, when a beam indicator changes from the first MAC CE to the second MAC CE, the terminal device may determine that the power control parameter corresponding to the spatial relation information in the second SRS resource corresponding to the second MAC CE is a target power control parameter.

Example 2: A first SRI is an SRS resource indicator for transmitting the PUSCH before the configuration information is received, and a second SRI is an SRS resource indicator for transmitting the PUSCH in the configuration information. The first SRI corresponds to a first SRS resource, the first SRS resource includes first spatial relation information, and the first spatial relation information includes the first SRI. The second SRI corresponds to a second SRS resource, the second SRS resource includes second spatial relation information, and the second spatial relation information includes the second SRI. The PUSCH resource includes a first set and a second set, the first set is a PUSCH power control parameter identifier set 1, and the second set is a PUSCH power control parameter identifier set 2. a power control parameter in the set 1 includes {P01, alpha1, PathlossReferenceRS1, CloseloopProcess1}, and a power control parameter in the set 2 includes {P02, alpha2, PathlossReferenceRS2, CloseloopProcess2}.

When a PUSCH beam indicator changes from the first SRI to the second SRI, the terminal device may determine that the power control parameter in the set 2 corresponding to the second SRI is a target power control parameter for transmitting the PUSCH.

Based on this solution, the configuration information is used to indicate at least one SRS resource, and the at least one SRS resource includes the target spatial relation information. When the terminal device determines that the MAC CE carrying the configuration information changes in comparison with the MAC CE carrying the first configuration information before the configuration information is received, or determines that the SRI in the configuration information changes in comparison with the SRI carried in the configuration information before the first configuration information is received, the power control parameter indicated in the SRS resource including the target spatial relation information may be indicated in the at least one SRS resource based on the configuration information.

Optionally, in this embodiment of this disclosure, any power control parameter includes at least one of the following: preset received power of the network device, a path loss compensation factor, a path loss calculation reference reference signal, and a closed loop power control process, where in a case that the target spatial relation information includes a target signal, the target signal is the path loss calculation reference reference signal.

The target signal may include a synchronization broadcast block (SSB) or a channel state information reference signal (CSI-RS). One SSB includes a primary synchronization signal (PSS), a secondary synchronization signal (SSS), and a physical broadcast channel (PBCH).

As shown in FIG. 3(b), the spatial relation information in the SRS resource may include an SSB identifier and a CSI-RS identifier.

Generally, if the target spatial relation information includes a target signal, a path loss calculation reference reference signal may be configured or may not be configured for the target power control parameter corresponding to the target spatial relation information.

Example 4: In a case that the target spatial relation information indicates transmission of the PUSCH, and the target spatial relation information includes an SSB, the SSB may be used as the path loss calculation reference reference signal to calculate transmit power of the PUSCH.

Example 5: If the target spatial relation information indicates transmission of the SRS, in a case that the target spatial relation information includes an SSB, the SSB may be used as the path loss calculation reference reference signal to calculate transmit power of the SRS.

In a possible example, when the beam indicator changes from the first SRI to the second SRI, the terminal device may calculate a path loss in the PUSCH power control parameter based on a second SSB in the target spatial relation information in the second SRS resource corresponding to the second SRI.

Example 6: In a case that the target spatial relation information indicates transmission of the PUSCH, and the target spatial relation information includes a CSI-RS, the CSI-RS may be used as the path loss calculation reference reference signal to calculate transmit power of the PUSCH.

Example 7: In a case that the target spatial relation information indicates transmission of the SRS, and the target spatial relation information includes a CSI-RS, the CSI-RS may be used as the path loss calculation reference reference signal to calculate transmit power of the SRS.

In a possible example, when the beam indicator changes from the first MAC CE to the second MAC CE, the terminal device may calculate a path loss in the SRS power control parameter based on a second CSI-RS in the target spatial relation information in the second SRS resource corresponding to the second MAC CE.

Based on this solution, in a case that the target spatial relation information includes the target signal, the terminal device may use the target signal as the path loss calculation reference reference signal to calculate the path loss in the power control parameter, to further calculate the transmit power of the target uplink data.

Optionally, a reference signal quasi co-located with a control resource set (CORESET) is used as a path loss calculation reference reference signal if no path loss calculation reference reference signal is configured for the target power control parameter.

Generally, quasi co-location (QCL) can be understood as QCL of two antenna ports if channel characteristics on one antenna port symbol can be deduced from another antenna port. A channel estimation result obtained from one antenna port may be used for another antenna port.

Example 8: If a PUSCH is transmitted, if no path loss calculation reference reference signal is configured for the PUSCH power control parameter indicated by the target spatial relation information, the terminal device may use a reference signal quasi co-located with a control resource set as a path loss calculation reference reference signal, and therefore calculate transmit power of the PUSCH.

Example 9: If the SRS is transmitted, and no path loss calculation reference reference signal is configured for the SRS power control parameter indicated by the target spatial relation information, the terminal device may use a reference signal quasi co-located with a control resource set as a path loss calculation reference reference signal, and therefore calculate transmit power of the SRS.

It should be noted that in a case that the reference signal quasi co-located with the control resource set is used as the path loss calculation reference reference signal, the terminal device may determine the transmit power of the target uplink data with reference to another parameter configured in the target power control parameter.

Based on this solution, if no path loss calculation reference reference signal is configured in the target power control parameter determined by the terminal device based on the configuration information, the terminal device may use the reference signal quasi co-located with the control resource set as the path loss calculation reference reference signal, and therefore calculate the transmit power of the target uplink data.

Figure 5:
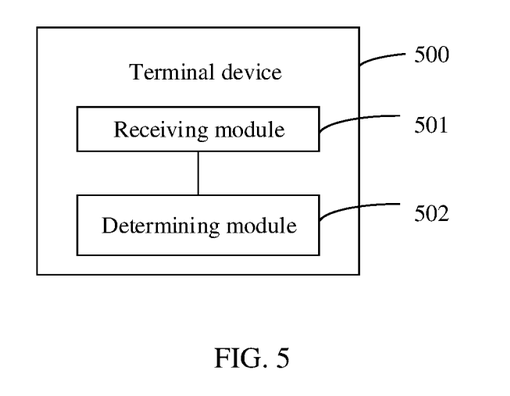
FIG. 5 is a schematic structural diagram 1 of a terminal device according to an embodiment of this disclosure.

As shown in FIG. 5, an embodiment of this disclosure provides a terminal device 500. The terminal device 500 includes a receiving module 501 and a determining module 502. The receiving module 501 is configured to receive configuration information from a network device, where the configuration information is used to indicate target spatial relation information of target uplink data. The determining module 502 is configured to determine transmit power of the target uplink data based on the target spatial relation information, where the target spatial relation information includes at least one of the following: M power control parameters, a target power control parameter corresponding to the target spatial relation information, and information used to indicate the target power control parameter, where M is a positive integer; and the target uplink data includes an SRS or a PUSCH.

Optionally, in a case that the target spatial relation information includes the M power control parameters and the information used to indicate the target power control parameter, the target power control parameter is at least one of the M power control parameters.

Optionally, in a case that the target uplink data is the SRS, the target spatial relation information includes at least one of the following: an SRS power control parameter set and an identifier of the SRS power control parameter set, and the SRS power control parameter set includes the target power control parameter.

Optionally, in a case that the target uplink data is the PUSCH, the target spatial relation information includes at least one of the following: a PUSCH power control parameter set, a PUSCH power control parameter identifier set, and a target SRI, where the PUSCH power control parameter set includes the target power control parameter, the PUSCH power control parameter identifier set includes an identifier of the target power control parameter, and the target SRI is used to indicate the PUSCH power control parameter identifier set.

Optionally, the M power control parameters are preconfigured by the network device for the terminal device or predefined.

Optionally, the configuration information is used to indicate at least one SRS resource, and the at least one SRS resource includes the target spatial relation information, where the configuration information is carried in a target MAC CE, and the at least one SRS resource is an SRS resource corresponding to the target MAC CE; and/or the configuration information includes a SRS resource indicator (SRI) of the at least one SRS resource.

Optionally, any power control parameter includes at least one of the following: preset received power of the network device, a path loss compensation factor, a path loss calculation reference reference signal, and a closed loop power control process, where in a case that the target spatial relation information includes a target signal, the target signal is the path loss calculation reference reference signal.

Figure 6:
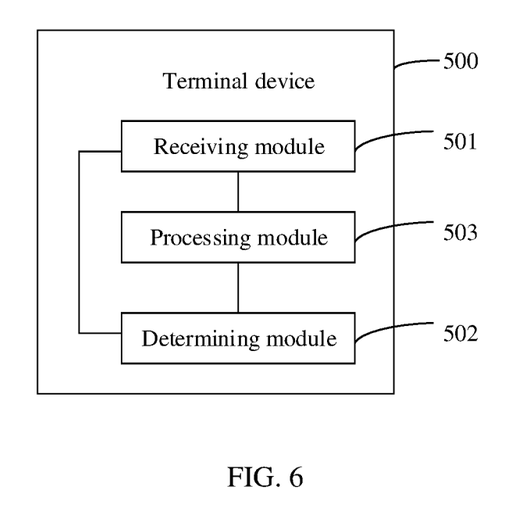
FIG. 6 is a schematic structural diagram 2 of a terminal device according to an embodiment of this disclosure.

Optionally, with reference to FIG. 5, as shown in FIG. 6, the terminal device further includes a processing module 503, where the processing module 503 is configured to use a reference signal quasi co-located with a control resource set as a path loss calculation reference reference signal if no path loss calculation reference reference signal is configured for the target power control parameter.

For the terminal device provided in this embodiment of this disclosure, first, the network device may transmit the configuration information to the terminal device, where the configuration information is used to indicate the target spatial relation information of the target uplink data; and the terminal device may determine the transmit power of the target uplink data based on the target power control parameter indicated by the target spatial relation information. In comparison with conventional uplink transmission, in a case that the spatial relation information changes, if the target spatial relation information includes at least one of the following: the M power control parameters, the target power control parameter corresponding to the target spatial relation information, and the information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, the SRS or the PUSCH), but also avoids signaling configuration overheads and a delay caused by reconfiguring the power control parameter.

The terminal device provided in this embodiment of this disclosure can implement the process shown in the foregoing method embodiment. To avoid repetition, details are not described herein again.

Figure 7:
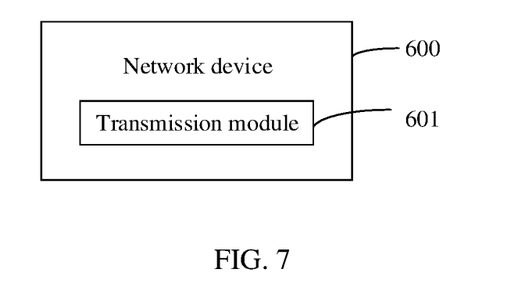
FIG. 7 is a schematic structural diagram 1 of a network device according to an embodiment of this disclosure.

As shown in FIG. 7, an embodiment of this disclosure provides a network device 600. The network device 600 includes a transmission module 601. The transmission module 601 is configured to transmit configuration information to a terminal device, where the configuration information is used to indicate target spatial relation information of target uplink data, and the target spatial relation information is further used to indicate the target power control parameter, where the target spatial relation information includes at least one of the following: M power control parameters, a target power control parameter corresponding to the target spatial relation information, and information used to indicate the target power control parameter, where M is a positive integer; and the target uplink data includes an SRS or a PUSCH.

Optionally, in a case that the target spatial relation information includes the M power control parameters and the information used to indicate the target power control parameter, the target power control parameter is at least one of the M power control parameters.

Optionally, in a case that the target uplink data is the SRS, the target spatial relation information includes at least one of the following: an SRS power control parameter set and an identifier of the SRS power control parameter set, and the SRS power control parameter set includes the target power control parameter.

Optionally, in a case that the target uplink data is the PUSCH, the target spatial relation information includes at least one of the following: a PUSCH power control parameter set, a PUSCH power control parameter identifier set, and a target SRI, where the PUSCH power control parameter set includes the target power control parameter, the PUSCH power control parameter identifier set includes an identifier of the target power control parameter, and the target SRI is used to indicate the PUSCH power control parameter identifier set.

Optionally, before transmitting the configuration information to the terminal device, the transmission module 601 is further configured to transmit the M power control parameters to the terminal device.

Optionally, the configuration information is further used to indicate at least one SRS resource, and the at least one SRS resource includes the target spatial relation information, where the configuration information is carried in a target MAC CE, and the at least one SRS resource is an SRS resource corresponding to the target MAC CE; and/or the configuration information includes an SRI of the at least one SRS resource.

For the network device provided in this embodiment of this disclosure, the network device may transmit the configuration information to the terminal device, where the configuration information is used to indicate the target spatial relation information of the target uplink data, so that the terminal device can determine the transmit power of the target uplink data based on the target power control parameter indicated by the target spatial relation information. In comparison with conventional uplink transmission, in a case that the spatial relation information changes, if the target spatial relation information includes at least one of the following: the M power control parameters, the target power control parameter corresponding to the target spatial relation information, and the information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, the SRS or the PUSCH), but also avoids signaling configuration overheads and a delay caused by reconfiguring the power control parameter.

The network device provided in this embodiment of this disclosure can implement the process shown in the foregoing method embodiment. To avoid repetition, details are not described herein again.

Figure 8:
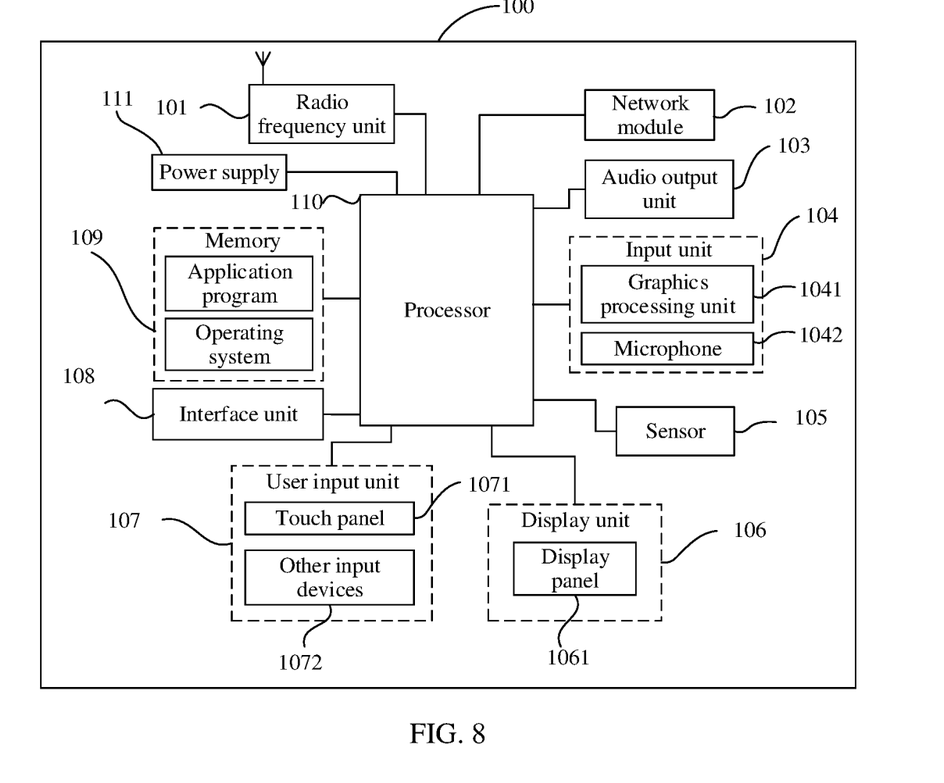
FIG. 8 is a schematic structural diagram 1 of hardware of a terminal device according to an embodiment of this disclosure.

FIG. 8 is a schematic structural diagram of hardware of a terminal device for implementing the embodiments of this disclosure. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that the structure of the terminal device 100 shown in FIG. 8 does not constitute any limitation on the terminal device. The terminal device 100 may include more or fewer components than those shown in the figure, or a combination of some components, or the components disposed differently. In this embodiment of this disclosure, the terminal device 100 includes but is not limited to a mobile phone, a tablet computer, a laptop computer, a palmtop computer, an in-vehicle terminal device, a wearable device, a pedometer, and the like.

The radio frequency unit 101 is configured to receive configuration information from a network device, where the configuration information is used to indicate target spatial relation information of target uplink data; and the processor 110 is configured to determine transmit power of the target uplink data based on the target spatial relation information, where the target spatial relation information includes at least one of the following: M power control parameters, a target power control parameter corresponding to the target spatial relation information, and information used to indicate the target power control parameter; the target power control parameter is at least one of the M power control parameters, where M is a positive integer; and the target uplink data includes an SRS or a PUSCH.

For the terminal device provided in this embodiment of this disclosure, the network device may transmit the configuration information to the terminal device, where the configuration information is used to indicate the target spatial relation information of the target uplink data; and the terminal device may determine the transmit power of the target uplink data based on the target spatial relation information. In comparison with conventional uplink transmission, in a case that the spatial relation information changes, if the target spatial relation information includes at least one of the following: the M power control parameters, the target power control parameter corresponding to the target spatial relation information, and the information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, the SRS or the PUSCH), but also avoids signaling configuration overheads and a delay caused by reconfiguring the power control parameter.

It should be understood that in this embodiment of this disclosure, the radio frequency unit 101 may be configured to: receive and transmit signals in an information receiving/transmitting process or a call process; and specifically, after receiving downlink data from a base station, transmit the downlink data to the processor 110 for processing, and in addition, transmit uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal device 100 provides a user with wireless broadband internet access through the network module 102, for example, helping the user to transmit and receive e-mails, browse web pages, and access streaming media.

The audio output unit 103 may convert audio data received by the radio frequency unit 101 or the network module 102 or stored in the memory 109 into an audio signal, and output the audio signal as a sound. In addition, the audio output unit 103 may also provide audio output (for example, a call signal received sound or a message received sound) related to a specific function performed by the terminal device 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042. The graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 can receive a sound and can process the sound into audio data. The processed audio data can be converted into a format output that can be sent to a mobile communication base station through the radio frequency unit 101 in a telephone call mode.

The terminal device 100 further includes at least one sensor 105, for example, an optical sensor, a motion sensor, and other sensors. Specifically, the optical sensor includes an ambient light sensor and a proximity sensor. The ambient light sensor may adjust luminance of the display panel 1061 based on brightness of ambient light, and the proximity sensor may turn off the display panel 1061 and/or backlight when the terminal device 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal device, functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include the display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal device 100. Specifically, the user input unit 107 includes a touch panel 1071 and other input devices 1072. The touch panel 1071, also referred to as a touchscreen, may capture a touch operation performed by the user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 110, and receives and executes a command sent by the processor 110. In addition, the touch panel 1071 may be implemented in a plurality of forms, for example, a resistive, capacitive, infrared, or surface acoustic wave touch panel. The user input unit 107 may further include the other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. After the touch panel 1071 detects a touch operation on or near the touch panel, the touch panel 1071 transmits the touch operation to the processor 110 to determine a type of a touch event. Then the processor 110 provides a corresponding visual output on the display panel 1061 based on the type of the touch event. Although in FIG. 8, the touch panel 1071 and the display panel 1061 act as two independent parts to implement input and output functions of the terminal device 100, in some embodiments, the touch panel 1071 and the display panel 1061 may be integrated to implement the input and output functions of the terminal device 100. This is not specifically limited herein.

The interface unit 108 is an interface between an external apparatus and the terminal device 100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 108 may be configured to receive an input (for example, data information or power) from an external apparatus and transmit the received input to one or more elements within the terminal device 100, or may be configured to transmit data between the terminal device 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a non-volatile memory, for example, at least one magnetic disk storage device, a flash memory, or other non-volatile solid-state storage devices.

The processor 110 is a control center of the terminal device 100, uses various interfaces and lines to connect parts of the entire terminal device 100, and executes various functions and processing data of the terminal device 100 by running or executing software programs and/or modules stored in the memory 109 and invoking data stored in the memory 109, so as to perform overall monitoring on the terminal device 100. The processor 110 may include one or more processing units. Optionally, the processor 110 may integrate an application processor and a modem processor. The application processor mainly processes the operating system, a user interface, an application program, and the like. The modem processor mainly processes wireless communication. It may be understood that the modem processor may alternatively not be integrated into the processor 110.

The terminal device 100 may further include a power supply 111 (such as a battery) that supplies power to components. Optionally, the power supply 111 may be logically connected to the processor 110 through a power management system. In this way, functions such as charge management, discharge management, and power consumption management are implemented by using the power management system.

In addition, the terminal device 100 includes some functional modules that are not shown, details of which are not described herein.

Figure 9:
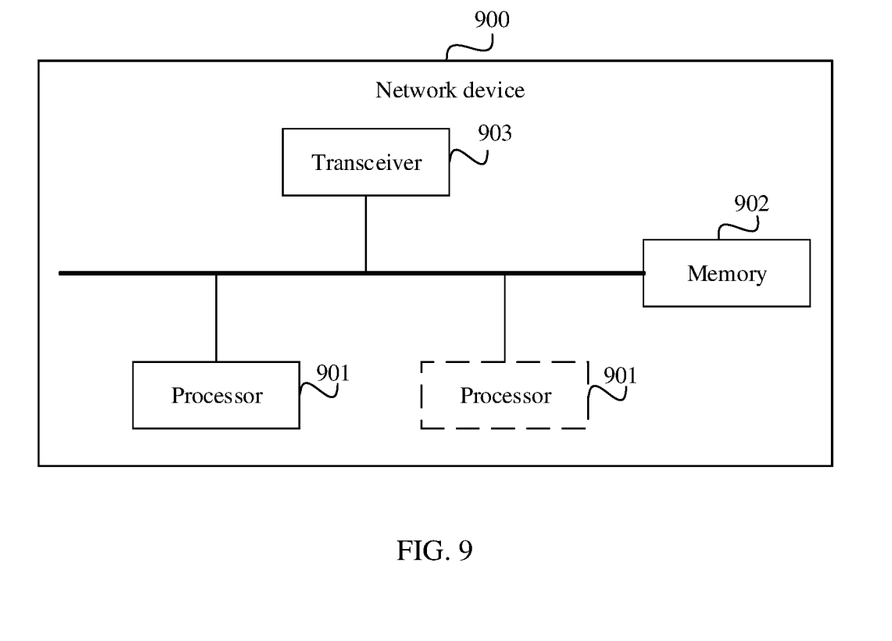
FIG. 9 is a schematic structural diagram 2 of hardware of a network device according to an embodiment of this disclosure.

FIG. 9 is a schematic structural diagram of hardware of a network device according to an embodiment of this disclosure. The network device 900 includes a processor 901, a memory 902, and a transceiver 903.

In this embodiment of this disclosure, one or more processors 901, the memory 902, and the transceiver 903 may be interconnected. The one or more processors 901 may be a baseband processing unit (BBU), or may be referred to as an indoor baseband processing unit; the transceiver may be a remote radio unit (RRU), or may be referred to as a remote control emission unit. In addition, the network device 900 may further include some functional modules that are not shown. Details are not described herein.

The transceiver is configured to transmit configuration information to a terminal device, where the configuration information is used to indicate target spatial relation information of target uplink data, and the target spatial relation information is further used to indicate the target power control parameter, where the target spatial relation information includes at least one of the following: M power control parameters, a target power control parameter corresponding to the target spatial relation information, and information used to indicate the target power control parameter; the target power control parameter is at least one of the M power control parameters, where M is a positive integer; and the target uplink data includes an SRS or a PUSCH.

In addition, the network device 900 includes some functional modules that are not shown. Details are not described herein.

For the network device provided in this embodiment of this disclosure, the network device may transmit the configuration information to the terminal device, where the configuration information is used to indicate the target spatial relation information of the target uplink data, and the target spatial relation information is further used to indicate the target power control parameter, so that the terminal device can determine, based on the configuration information received from the network device, the target power control parameter indicated by the target spatial relation information, and determine transmit power of the target uplink data. In comparison with conventional uplink transmission, in a case that the spatial relation information changes, if the target spatial relation information includes at least one of the following: the M power control parameters, the target power control parameter corresponding to the target spatial relation information, and the information used to indicate the target power control parameter, where M is a positive integer, without waiting for the network device to reconfigure a power control parameter, the terminal device may directly obtain or find the target power control parameter based on the target spatial relation information indicated by the configuration information, so that the terminal can use an accurate power control parameter to control power of the target uplink data. This not only prevents the terminal device from using inaccurate power to transmit the target uplink data (that is, the SRS or the PUSCH), but also avoids signaling configuration overheads and a delay caused by reconfiguring the power control parameter.

Optionally, an embodiment of this disclosure further provides a terminal device. The terminal device includes a processor, a memory, and a computer program stored in the memory and capable of running on the processor. When the computer program is executed by the processor, the processes of the power control method in the foregoing embodiments are implemented, with the same technical effect achieved. To avoid repetition, details are not described herein again.

Optionally, an embodiment of this disclosure further provides a network device. The terminal device includes a processor, a memory, and a computer program stored in the memory and capable of running on the processor. When the computer program is executed by the processor, the processes of the power control method in the foregoing embodiments are implemented, with the same technical effect achieved. To avoid repetition, details are not described herein again.

An embodiment of this disclosure further provides a communications system. The communications system includes the terminal device and network device in the foregoing embodiment.

An embodiment of this disclosure further provides a computer-readable storage medium, where the computer-readable storage medium stores a computer program. When the computer program is executed by a processor, a plurality of processes of the power control method in the foregoing embodiment are implemented, with the same technical effect achieved. To avoid repetition, details are not described herein again. The computer-readable storage medium is, for example, a read-only memory (ROM), a random access memory (RAM), a magnetic disk, or an optical disc.

An embodiment of this disclosure further provides a computer-readable storage medium, where the computer-readable storage medium stores a computer program. When the computer program is executed by a processor, a plurality of processes of the power control method in the foregoing embodiment are implemented, with the same technical effect achieved. To avoid repetition, details are not described herein again. The computer-readable storage medium is, for example, a ROM, a RAM, a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the power control method described in a plurality of embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection scope of this disclosure.

What is claimed is:

1. A power control method, wherein the method comprises:
    receiving, by a terminal, configuration information from a network device, wherein the configuration information is used to indicate target spatial relation information of target uplink data; and
    determining, by the terminal, transmit power of the target uplink data based on the target spatial relation information; wherein
    the target spatial relation information comprises at least one of the following: M power control parameters, a target power control parameter corresponding to the target spatial relation information, and information used to indicate the target power control parameter, wherein M is a positive integer; and
    the target uplink data comprises a sounding reference signal SRS or a physical uplink shared channel PUSCH;
    wherein if no path loss calculation reference reference signal is configured for the target power control parameter, a reference signal quasi co-located with a control resource set is used as a path loss calculation reference reference signal.

2. The method according to claim 1, wherein in a case that the target spatial relation information comprises the M power control parameters and the information used to indicate the target power control parameter, the target power control parameter is at least one of the M power control parameters.

3. The method according to claim 1, wherein in a case that the target uplink data is the SRS, the target spatial relation information comprises at least one of the following: an SRS power control parameter set and an identifier of the SRS power control parameter set, and the SRS power control parameter set comprises the target power control parameter.

4. The method according to claim 1, wherein in a case that the target uplink data is the PUSCH, the target spatial relation information comprises at least one of the following: a PUSCH power control parameter set, a PUSCH power control parameter set identifier, and a target SRI, wherein the PUSCH power control parameter set comprises the target power control parameters, the PUSCH power control parameter set identifier comprises an identifier of the target power control parameter, and the target SRI is used to indicate the PUSCH power control parameter set identifier.

5. The method according to claim 1, wherein the M power control parameters are preconfigured by the network device for the terminal device or predefined.

6. The method according to claim 1, wherein
    the configuration information is used to indicate at least one SRS resource, and the at least one SRS resource comprises the target spatial relation information, wherein the configuration information is carried in a target MAC CE, and the at least one SRS resource is an SRS resource corresponding to the target MAC CE; and/or the configuration information comprises a SRS resource indicator (SRI) of the at least one SRS resource.

7. The method according to claim 1, wherein any power control parameter comprises at least one of the following: preset receive power of the network device, a path loss compensation factor, a path loss calculation reference reference signal, and a closed loop power control process, wherein in a case that the target spatial relation information comprises a target signal, the target signal is the path loss calculation reference reference signal.

8. A terminal device, comprising a processor, a memory, and a computer program stored in the memory and capable of running on the processor, wherein when the computer program is executed by the processor, the steps of the power control method are implemented, the method comprises:
receiving, by a terminal, configuration information from a network device, wherein the configuration information is used to indicate target spatial relation information of target uplink data; and
determining, by the terminal, transmit power of the target uplink data based on the target spatial relation information; wherein
the target spatial relation information comprises at least one of the following: M power control parameters, a target power control parameter corresponding to the target spatial relation information, and information used to indicate the target power control parameter, wherein M is a positive integer; and
the target uplink data comprises a sounding reference signal SRS or a physical uplink shared channel PUSCH;
wherein if no path loss calculation reference reference signal is configured for the target power control parameter, a reference signal quasi co-located with a control resource set is used as a path loss calculation reference reference signal.

9. The terminal device according to claim 8, wherein in a case that the target spatial relation information comprises the M power control parameters and the information used to indicate the target power control parameter, the target power control parameter is at least one of the M power control parameters.

10. The terminal device according to claim 8, wherein in a case that the target uplink data is the SRS, the target spatial relation information comprises at least one of the following: an SRS power control parameter set and an identifier of the SRS power control parameter set, and the SRS power control parameter set comprises the target power control parameter.

11. The terminal device according to claim 8, wherein in a case that the target uplink data is the PUSCH, the target spatial relation information comprises at least one of the following: a PUSCH power control parameter set, a PUSCH power control parameter set identifier, and a target SRI, wherein the PUSCH power control parameter set comprises the target power control parameters, the PUSCH power control parameter set identifier comprises an identifier of the target power control parameter, and the target SRI is used to indicate the PUSCH power control parameter set identifier.

12. The terminal device according claim 8, wherein the M power control parameters are preconfigured by the network device for the terminal device or predefined.

13. A network device, comprising a processor, a memory, and a computer program stored in the memory and capable of running on the processor, wherein when the computer program is executed by the processor, the steps of the power control method are implemented, the method comprises:
transmitting configuration information to a terminal device, wherein the configuration information is used to indicate target spatial relation information of target uplink data, wherein
the target spatial relation information comprises at least one of the following: M power control parameters, a target power control parameter corresponding to the target spatial relation information, and information used to indicate the target power control parameter, wherein M is a positive integer; and
the target uplink data comprises a sounding reference signal SRS or a physical uplink shared channel PUSCH;
wherein if no path loss calculation reference reference signal is configured for the target power control parameter, a reference signal quasi co-located with a control resource set is used as a path loss calculation reference reference signal.

14. The network device according to claim 13, wherein in a case that the target spatial relation information comprises the M power control parameters and the information used to indicate the target power control parameter, the target power control parameter is at least one of the M power control parameters.

15. The network device according to claim 13, wherein in a case that the target uplink data is the SRS, the target spatial relation information comprises at least one of the following: an SRS power control parameter set and an identifier of the SRS power control parameter set, and the SRS power control parameter set comprises the target power control parameter.

16. The network device according to claim 13, wherein in a case that the target uplink data is the PUSCH, the target spatial relation information comprises at least one of the following: a PUSCH power control parameter set, a PUSCH power control parameter identifier set, and a target SRI, wherein the PUSCH power control parameter set comprises the target power control parameter, the PUSCH power control parameter identifier set comprises an identifier of the target power control parameter, and the target SRI is used to indicate the PUSCH power control parameter identifier set.

17. The network device according to claim 13, wherein before the transmitting configuration information to a terminal device, the method further comprises:
transmitting the M power control parameters to the terminal device.

18. The network device according to claim 13, wherein the configuration information is further used to indicate at least one SRS resource, and the at least one SRS resource comprises the target spatial relation information, wherein the configuration information is carried in a target MAC CE, and the at least one SRS resource is an SRS resource corresponding to the target MAC CE; and/or the configuration information comprises an SRI of the at least one SRS resource.

* * * * *